May 9, 1967  D. H. MAY  3,318,225
DAMPER ASSEMBLY
Filed Oct. 15, 1965  3 Sheets-Sheet 1
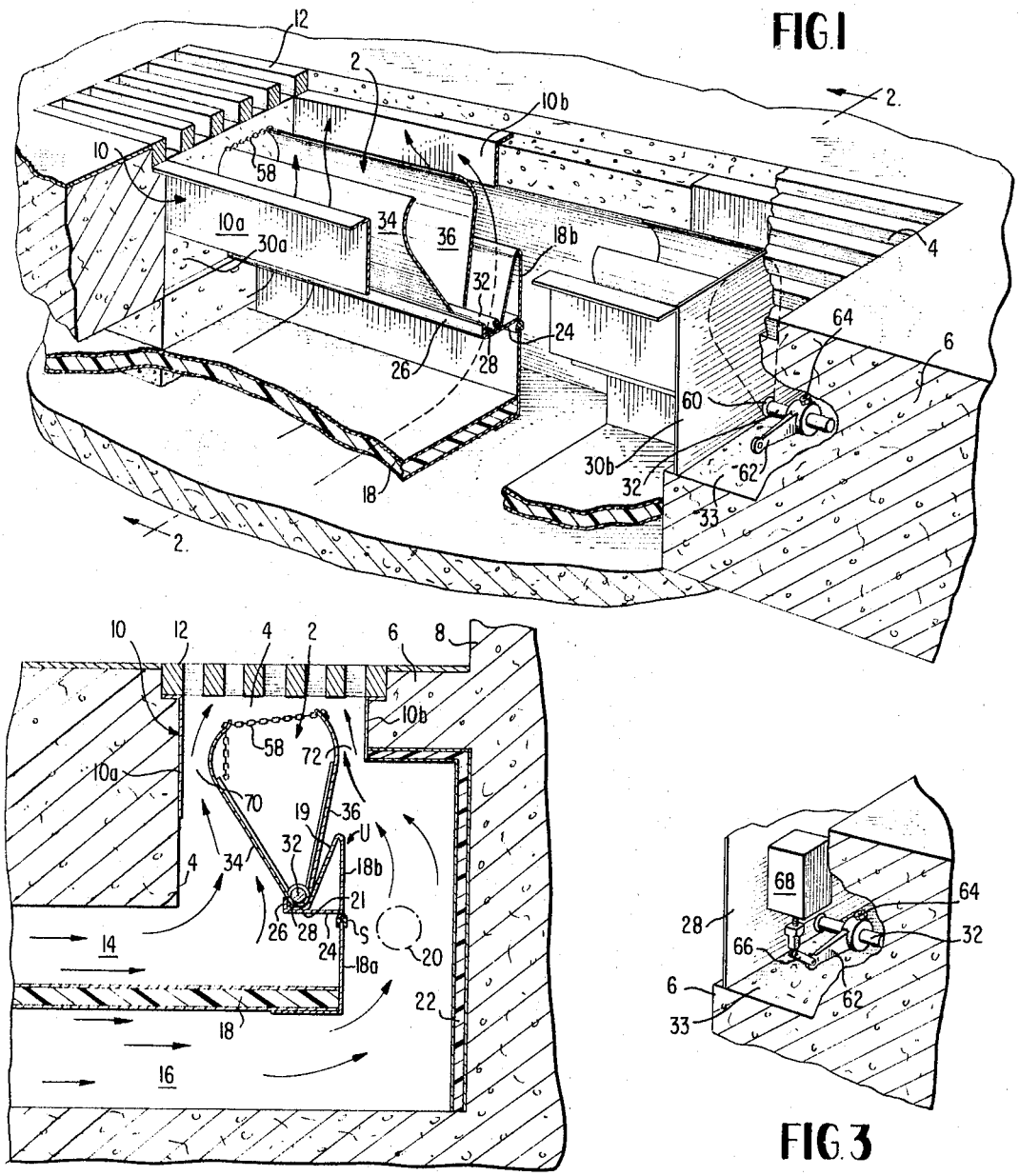
INVENTOR
DOUGLASS H. MAY
BY James H. Littlepage
ATTORNEY

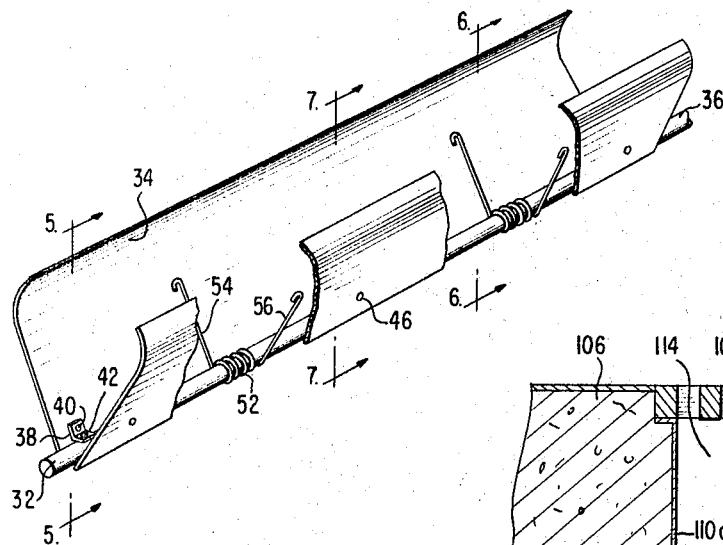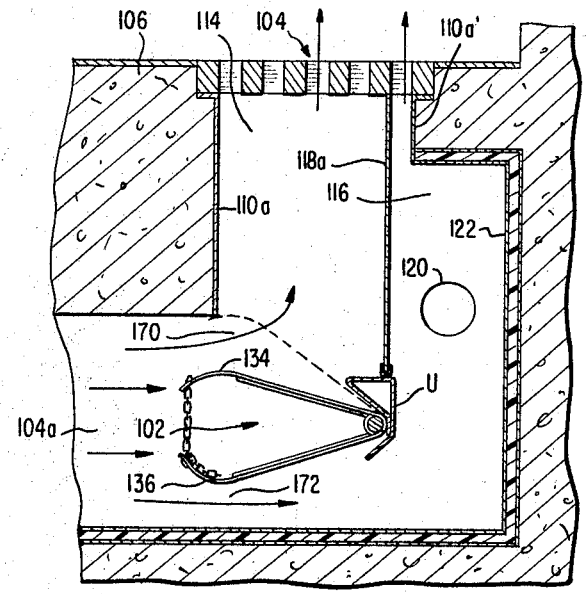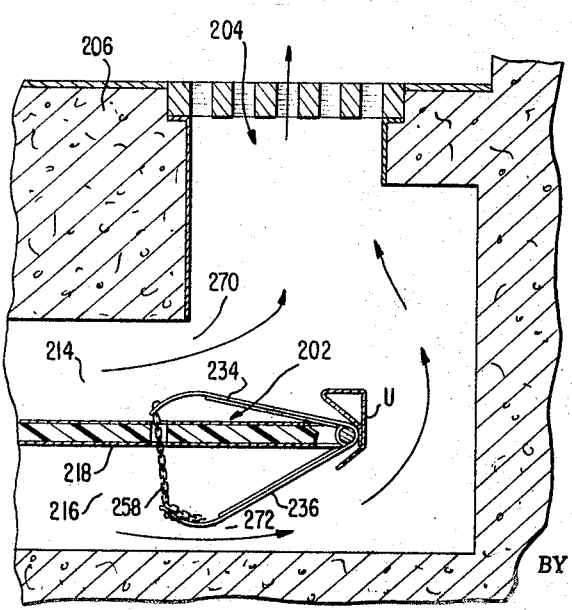

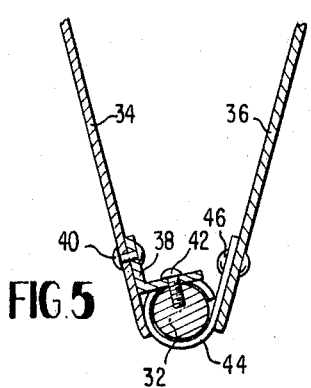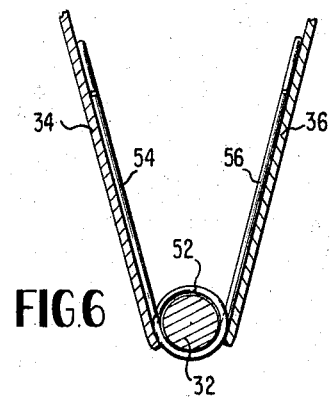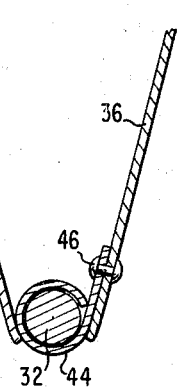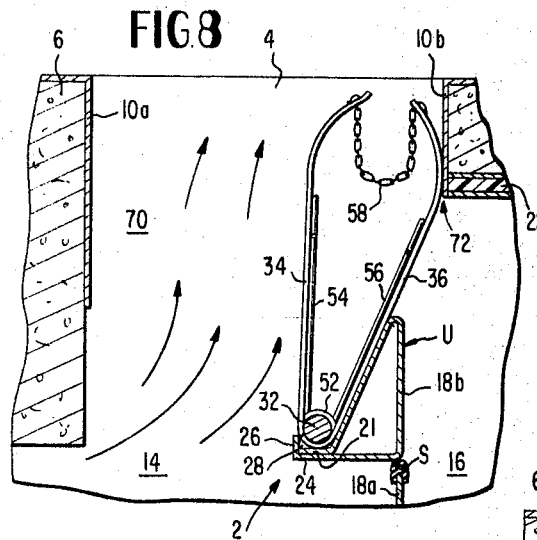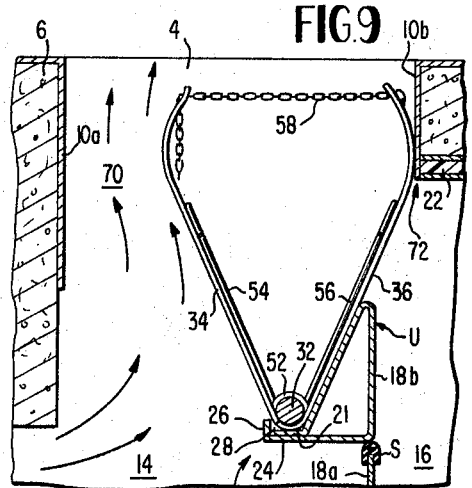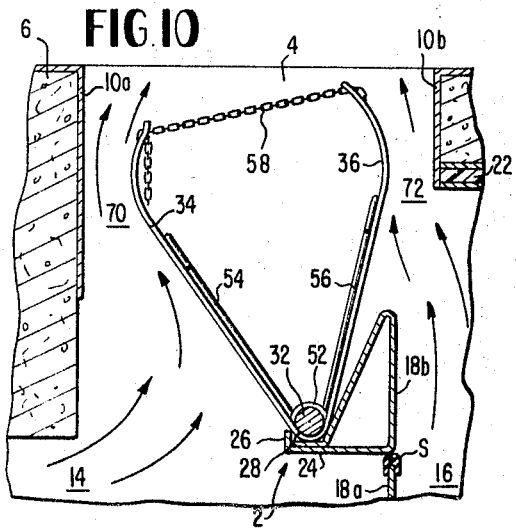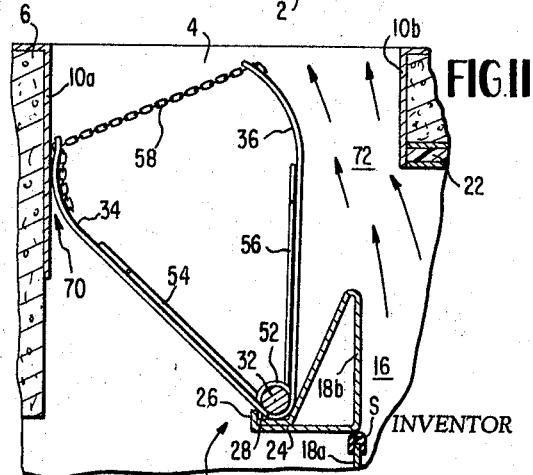

United States Patent Office 3,318,225
Patented May 9, 1967

3,318,225
DAMPER ASSEMBLY
Douglass H. May, 2713 Lakeport Drive,
Bridgeton, Mo. 63042
Filed Oct. 15, 1965, Ser. No. 496,267
11 Claims. (Cl. 98—38)

This invention relates to a damper applicable to single-duct or two-duct forced air heating, cooling or heating and cooling systems currently used in buildings.

The primary object of this invention is to provide a damper mechanism for controlling the outflow of air through two adjacent ducts in such manner that either duct may be completely closed off, and infinite variations in the ratio of openings of the two ducts into the outlet port may be attained. For purposes of explanation, let it be assumed that relatively cold air is supplied by one duct and warm air is supplied by the other duct. In accordance with this invention, it is possible, by the use of a single damper assembly driven by an actuator which preferably is controlled by a temperature-responsive element, to supply to the single or dual outlets a maximum amount of all cold air and no warm air, various lesser amounts of cold air and no warm air, various ratios of both cold and warm air, and no cold air and a maximum amount of warm air. A further object is to provide for adjustment of the maximums of both the cold and warm air and the adjustment of the total volume of combined cold and warm air.

A more specific object is to provide a damper assembly having two plates which are pivoted together in a manner somewhat comparable in over-all configuration to butterfly wings, the plates being disposed in one or more passages connected to the cold and warm ducts. One of the plates is constructed to move with a supporting drive shaft, while the other plate may rotate on the supporting shaft. In the preferred embodiment, a spring normally biases the plates to spread apart, and a flexible connector adjustably limits the maximum spread. By rocking the supporting shaft in one direction or another, the plates may be swung so that one plate or other closes off the outlet passage from the terminus of one duct or the other, or the plates may be swung to various intermediate positions to vary the relative sizes of the openings of the ducts into outlet passage means.

These and other objects will be apparent from the following specifications and drawings, in which:

FIG. 1 is a perspective view, broken away, showing a damper assembly and associated part constructed in accordance with the invention;

FIG. 2 is a vertical cross-section taken transversely through FIG. 1 approximately along the line 2—2;

FIG. 3 is a fragmentary cross sectional view showing a typical actuating unit for the damper;

FIG. 4 is a perspective view of the damper assembly removed from the associated ducts and mountings:

FIG. 5, FIG. 6 and FIG. 7 are transverse cross sections along the lines 5—5, 6—6 and 7—7 respectively of FIG. 4;

FIG. 8 is a fragmentary cross-section showing the damper assembly in one extreme position in which the air from one duct is completely cut off, and in which a maximum passage for air from the other duct is provided;

FIG. 9 is a view similar to FIG. 8, but showing the damper assembly in an intermediate position in which the air from one duct is completely cut off, and in which a restricted passage for air from the other duct is provided;

FIG. 10 is a view similar to FIGS. 8 and 9, but showing the damper assembly in another intermediate position in which restricted passages for air from both ducts is provided;

FIG. 11 is a view similar to FIGS. 8, 9 and 10, but showing the damper assembly in its other extreme position in which the air from the other duct is completely shut off and a maximum passage for air from the other duct is provided; and, FIGS. 12 and 13 are views similar to FIG. 2 but showing adaptations of the baffle structure to alternate arrangements of the ducts and outlets.

Referring now to the drawings, in which like reference numerals denote similar elements, the damper assembly 2 is adapted for mounting in an outlet opening 4 in the floor or sill 6 of a room at a suitable location, such as near a wall 8. Within opening 4 is a casing 10, which may be of sheet metal, having opposite longitudinal side walls 10a and 10b, and across opening 4 may be disposed a suitable removable grill 12, such as the slotted one illustrated.

Leading through floor 6 towards opening 4 are a pair of ducts 14 and 16 separated by a partition 18 which terminates in a divider baffle 18a. For purposes of illustration, it will be assumed that duct 14 is connected to a relatively cold air supply and duct 16 is connected to a relatively warm air supply. Alternatively, partition 18 may be dispensed with, the combined volume of ducts 14 and 16 constituting a plenum chamber, in which case a heat transfer element 20, shown in dash lines in FIG. 2, would be disposed on one side of divider baffle 18a for tempering the air passing thereby. In any event, two streams of air, one warmer than the other, are fed through throats 70 and 72 into the common outlet opening 4. Throat 70 is the shortest possible span between driven baffle 34 and wall 10a; and throat 72 is the shortest possible span between follower baffle 36 and wall 10b. Insulation 22 may be provided on the wall side of the channel, in this instance channel 16, through which passes the tempered air.

Connected by a seal S to the top edge of divider baffle 18 is a sheet metal unit U consisting of an upward extension 18b of divider baffle 18a, a ledge 24 which terminates in an upward flange 26, and bent diagonally downward from the top edge of extension 18b is an inclined wall 19 which terminates in a foot strip 21 providing, with flange 26 and inclined wall 19, a shallow trough 28. Across at least one end of casing 10 is an end wall 30 to which the ends of divider baffle 18a, ledge 24, flange 26 and walls 10a, 10b are secured, and on the outer side of wall 30 is a recess 32 in floor 6, the purpose of which will be apparent hereinafter.

Loosely supported in trough 28 is a shaft 32 to which is rigidly affixed one edge of a driven damper 34, and rotatably mounted on shaft 32 is a follower damper 36. Dampers 34 and 36 are essentially elongate plates, and their rigidity and their rigid and rotatable mountings may be constituted by various structural and mechanical expediencies. In the present example, a driven damper 34 is mounted on shaft 32 for turning therewith by means of angle brackets 38, the arms of which are secured by rivets 40 and screws 42 to the driven damper and shaft (FIGS. 4 and 5). Follower damper 36 is hingedly mounted on shaft 32 by looped strips 44 (FIG. 7). One end of each strip 44 is riveted to follower-damper 36.

Wrapped around shaft 32 are coil expansion springs 52 whose free ends 54 and 56 respectively engage against driven and follower dampers 34 and 36, thus biasing the dampers to swing apart in a manner somewhat comparable to butterfly wings. Connected across the tops of the dampers is a flexible and adjustable stop, i.e., a bead chain 58 engaging in slots, not shown, in the top edges of the dampers. The extent to which coil springs 52 are permitted to spread dampers 34, 36 apart may be adjusted by shortening or lengthening the span of bead chain 58.

One end of shaft 32 extends outwardly through a hole 60 (FIG. 1) through end wall 30 of casing 10 into recess 33, and on the outer end of shaft 32 an operating arm 62 is mounted by suitable means, such as collar 64. Although shaft 32 may be turned by hand, it is contemplated that it be rotated via suitable drive linkage 66 (FIG. 3) by means of a temperature-responsive actuator 68. The sensing element for actuator 68 would, of course, be normally disposed at a suitable location within the room into which outlet opening 4 leads.

Referring to FIGS. 8–11, and assuming that relatively warm air is fed towards throat 72 and relatively cool air is fed towards throat 70, the operation of dampers 34 and 36 would, under typical conditions, be as follows: At the outset, the maximum volume of air permitted to pass through one throat or the other, or the total volume through both throats into the common outlet opening 4 would be predetermined by the selected span of bead chain 58. If, for example, a comparatively small volume of air through outlet opening 4 were desired, the span of bead chain 58 would be lengthened; and if a large volume of air from outlet 4 were desired, than the span of bead chain 58 would be shortened. In the present example, the maximum opening of throat 70 can also be adjusted by limiting the clockwise rotation of shaft 32.

FIG. 8 illustrates the condition of the damper when maximum volume of cool air is desired. Shaft 32 has rocked clockwise, as seen here, to a position in which damper 36 has closed throat 72, and shaft 32 has swung damper 34 to the right, away from wall 10a, so that the opening of throat 70 is maximum. In this condition, the maximum volume of cool air is delivered into outlet opening 4.

In the transition from the FIG. 8 condition to the FIG. 9 condition, it will be assumed that the demand for cool air has decreased. Shaft 32 has accordingly been rocked counter-clockwise from its FIG. 8 position. Coil spring 52 maintains follower damper 36 against wall 10b so that throat 72 remains closed. Damper 34, in swinging towards wall 10a, has partly closed throat 70, thereby decreasing the volume of cool air delivered to outlet opening 4.

In transition from the FIG. 9 position to the FIG. 10 condition, shaft 32 has rocked further counterclockwise so as to drive damper 34 further towards wall 10a, thereby further reducing the span of throat 70. In this motion, however, bead chain 58 has pulled follower damper 36 to the left so that throat 72 has been partly opened, and thus limited volumes of both cool and warm air are permitted to pass into outlet opening 4. Further counter-clockwise rocking of shaft 32 in response to demand for more heat brings the dampers to their FIG. 11 positions in which throat 70 is closed and the opening across throat 72 is maximum.

In its broader aspects, the damper assembly comprises two air supply conduits 14 and 16 having a common wall, i.e., baffle 18a and/or unit u with junctions 70, 72 leading into a common outlet 4, the latter of which has opposed walls 10a, 10b which are spaced from one another and from the common wall 18a of the air supply conduits. Damper 34, 36 are essentially plates in V configuration with a lost-motion connection between them constituted by the fixed mounting of plate 34 on shaft 32, the pivotal mounting of plate 36 on shaft 32, spring 52 which biases the plates apart, and bead chain 58 (essentially a strap) which limits the spreading apart movement of the plates. This lost-motion connection is responsible for the ability of damper plate 34 to variably throttle throat 70 while damper plate 36 maintains throats 72 closed.

The configuration of conduits 14 and 16 may vary, as also may the shapes of dampers 34 and 36. For example, the dampers could be straight-sided; ducts 14 and 16 could form a T with outlet 4, in which case the dampers would be disposed across the juncture of the head and stem of the T. Also, a sliding rod or other equivalent adjustable stop mechanism could be substituted for the bead chain 58.

FIG. 12 shows an alternate arrangement in which an outlet opening 104 in a floor 106 is divided into two channels 114, 116 by a baffle 118a. Preferably, liners 110a, 110a' and thermal insulation 122 are provided. A single supply duct for air 104a and a heat exchange device (either hot or cold) 120 is disposed in channel 116. Damper assembly 102 is mounted on the inner end of divider baffle 118 so as to close off either or both of throats 170 or 172 in the manner previously described in connection with damper assembly 2. However, if the upper damper 134 is driven, gravity may be utilized instead of a spring to bias follower damper 136 apart.

FIG. 13 illustrates a variation of the FIG. 12 arrangement. A single outlet 204 in floor 206 is controlled by a damper assembly 202, similar in operation to assemblies 2 and 102 except in that dampers 234, 236 operate on opposite sides of a baffle 218 which extends into outlet passage 204 separates cold and hot air supply ducts 214, 216. Baffles 234, 236 control throats 270, 272 in essentially the same manner as do baffles 34, 36 control throats 34, 36. An opening through baffle 218 should, of course, be provided for the free passage therethrough of bead chain 258.

The invention is not limited to the details of the exemplary structure shown and described herein, but is intended to cover all substitutions, modifications and equivalents within the scope of the following claims.

I claim:
1. A damper assembly, comprising:
  (a) means defining a pair of air conduits having a common partition in a common passage defined between two opposed walls spaced from one another and from said common partition, said conduits being adapted to conduct relatively cool and warm air,
  (b) a pair of damper plates disposed in generally V-forming configuration with edges thereof which form the apex of the V disposed adjacent said common partition, said damper plates having surfaces disposed away from the apex of the V which lie respectively opposite the opposed walls and which cooperate with said opposed walls to define throats controlled by the damper plates,
  (c) a drive shaft,
  (d) means mounting said drive shaft for rocking about an axis extending along the apex of the V formed by the damper plates,
  (e) a driving connection between said drive shaft and one of said damper plates,
  (f) a pivotal connection between said drive shaft and the other of said damper plates, whereby said damper plates may swing towards and apart from one another,
  (g) the other of said plates being biased to swing apart from said one plate,
  (h) means for limiting the apart swinging of said damper plates,
  (i) and means for rocking said drive shaft about said axis in one direction or the other, whereby the relative widths of said throats may be varied by simultaneous swinging of said damper plates between positions wherein said surfaces lie away from said opposed walls and whereby the width of the throat controlled by the surface on said one damper plate may be independently varied when the surface of the other damper plate lies against the wall opposite thereto.

2. The combination claimed in claim 1, the means for limiting the apart swinging of said damper plates comprising a strap of adjustable total effective length whereby the maximum total width of the throats between the surfaces on the baffle plates and the opposed walls of the outlet may be predetermined by adjustment of the strap length.

3. The combination claimed in claim 2, said strap comprising a flexible bead chain,
   means securing one end of said bead chain to one of said baffle plates,
   and slot means in the other baffle plate for accommodating a selected one of the beads adjacent the other end of the bead chain.

4. The combination claimed in claim 1, said other damper plate being biased to swing apart from said one damper plate by a coil expansion spring having an intermediate portion wrapped around said shaft and free end portions engaging against the damper plates.

5. In combination,
   (a) a room defined by structure having an air outlet passage with an end terminating in said room,
      (1) said outlet passage having opposed spaced side wall portions extending inwardly from said end,
   (b) a baffle having a free edge portion extending across said outlet passage inwardly of said end in a plane lying between said side wall portions,
      (1) said baffle dividing a portion of said outlet passage inwardly from said end into two air conduits which join the outlet via gaps which extend between the free edge portion of the baffle and said side wall portions,
   (c) air passage means in the room structure for feeding two streams of air at respectively different temperatures to said air conduit means,
   (d) a drive shaft,
   (e) means mounting said drive shaft for rotation about an axis extending along the free edge portion of the baffle,
   (f) a first damper plate extending outwardly from said drive shaft,
   (g) means mounting an edge portion of said first damper plate on said shaft for rocking motion therewith,
   (h) a second damper plate extending outwardly from said drive shaft,
   (i) means pivotally mounting an edge portion of said second damper plate along said drive shaft,
   (j) means for biasing said damper plates to pivot apart from one another,
   (k) means for limiting the apart pivoting of said damper plates, whereby said damper plates are maintained in generally V-forming relationship with the maximum spacing of the wings of the V less than the space between said side wall portions,
   (l) said damper plates having surfaces disposed away from the apex of the V respectively engageable with said side wall portions upon rocking of said shaft in one direction or the other,
   (m) and means responsive to temperature desired in said room for rocking said shaft in one direction or the other.

6. In a dual damper assembly for controlling the passages of two streams of air,
   (a) a rockable drive shaft,
   (b) a first damper plate fixed on said shaft for rocking therewith,
   (c) a second damper plate pivoted on said shaft for pivoting relative thereto,
   (d) bias means for urging said damper plates to pivot apart from one another, whereby to form a V with the first damper plate,
   (e) stop means for limiting the apart pivoting of said damper plates, whereby to limit the span between the wings of the V to a normal maximum width,
   (f) a conduit having opposed wall surfaces selectively engageable by the respective plates,
      (1) said surfaces lying outwardly of the wings of the V and spaced apart a distance greater than the normal maximum width of the V whereby said two streams of air may pass simultaneously through gaps between said damper plates and said wall surfaces when said damper plates are disposed in an intermediate position between said surfaces,
   (g) and means for rocking said drive shaft whereby to vary the relative widths of said gaps,
   (h) the mountings of said plates on said shaft, the bias means and the stop means providing for independent adjustment of the gap which lies between the plate which is fixed on the shaft and the wall surface lying outwardly thereof when the shaft is rocked to engage the pivoted plate against the wall surface lying outwardly thereof.

7. The combination claimed in claim 6, said stop means comprising a tie member extending from plate-to-plate across the wings of the V.

8. The combination claimed in claim 7, said tie member comprising a flexible strand connected to one of said plates for adjustment of the tying length thereof, whereby the maximum width of span between the wings of the V may be adjusted.

9. A damper assembly, comprising:
   (a) means defining a pair of air supply conduits having a common partition, said conduits having junctures with a common outlet defined between two opposed walls spaced from one another and from said common partition, said conduits being adapted to conduct relatively cool and warm air to said common outlet,
   (b) a pair of damper plates disposed in generally V-forming configuration with edges thereof which form the apex of the V disposed adjacent said common partition, said damper plates having surfaces disposed away from the apex of the V which lie respectively opposite the opposed walls of the outlet and which cooperate with said opposed walls to define throats across the downstream sides of said junctures,
   (c) a drive shaft,
   (d) means mounting said drive shaft for rocking about an axis extending along the apex of the V formed by the damper plates,
   (e) a driving connection between said drive shaft and one of said damper plates,
   (f) a pivotal connection between said drive shaft and the other of said damper plates, whereby said damper plates may swing towards and apart from one another,
   (g) means for biasing said plates to swing apart,
   (h) means for limiting the apart swinging of said plates, and
   (i) means for rocking said drive shaft in one direction or the other, whereby the relative widths of said throats may be varied by simultaneous swinging of said damper plates between positions wherein said surfaces lie intermediate the opposed walls of the outlet and whereby the width of the throat lying between the surface on said one damper plate and the wall opposite thereto may be independently varied when the surface of the other damper plate lies against the wall opposite thereto.

10. A damper assembly, comprising:
   (a) means defining a pair of air outlet conduits having a common partition and a common supply passage connecting with said air outlet conduits defined between two opposed walls spaced from one another and from said common partition,
   (b) means in one of said outlet conduits for tempering air flowing therethrough,
   (c) a pair of damper plates disposed in generally V-forming configuration with edges thereof which form the V disposed adjacent said common partition, said damper plates having surfaces disposed away from the apex of the V which extend into the supply passage and which lie respectively opposite the opposed walls of the supply passage and which cooperate with said opposed walls to define throats controlled by the damper plates,
(d) a drive shaft,
(e) means mounting said drive shaft for rocking about an axis extending along the apex of the V formed by the damper plates,
(f) a driving connection between the drive shaft and one of said damper plates,
(g) a pivotal connection between said drive shaft and the other of said damper plates, whereby said damper plates may swing towards and apart from one another,
(h) the other of said plates being biased to swing apart from said one plate,
(i) means for limiting the apart swinging of said plates, and
(j) means for rocking said drive shaft about said axis in one direction or the other, whereby the relative widths of the throats may be varied by simultaneously swinging said damper plates between positions wherein said surfaces lie away from said opposed walls of the supply passage and whereby the width of the throat controlled by the surface on said one damper plate may be independently varied when the surface of the other damper plate lies against the wall opposite thereto.

11. A damper assembly, comprising:
(a) means defining a pair of air supply conduits having a common partition extending into a common outlet passage defined between two opposed walls spaced from another and from said common partition, said conduits being adapted to conduct relatively cool and warm air to said common outlet passage,
(b) a pair of damper plates disposed in generally V-forming configuration with edges thereof which form the apex of the V disposed adjacent said common partition, said damper plates having surfaces disposed away from the apex of the V which lie respectively between the opposed walls of the outlet passage and the common partition and which cooperate with said opposed walls to define throats,
(c) a drive shaft,
(d) means mounting said drive shaft for rotation about an axis extending along the apex of the V formed by the damper plates,
(e) a driving connection between said drive shaft and one of the damper plates,
(f) a pivotal connection between said drive shaft and the other damper plate, whereby said damper plates may swing towards and apart from one another,
(g) the other damper plate being biased to swing apart from said one damper plate,
(h) means for limiting the apart swinging of said damper plates, and
(i) means for rocking said drive shaft about said axis in one direction or the other, whereby the relative widths of said throats may be varied by simultaneous swinging of said damper plates between positions wherein said surfaces lie away from said opposed walls and whereby the width of the throat controlled by the surface of said one damper plate may be independently varied when the surface of the other damper plate lies against the wall opposite thereto.

References Cited by the Examiner
UNITED STATES PATENTS 2,290,985   7/1942   McElgin _____ 236—13 X
2,575,907   11/1951  Carlson _____ 236—13 X ROBERT A. O'LEARY, *Primary Examiner.*

W. E. WAYNER, *Assistant Examiner.*